United States Patent [19]
Chang

[11] Patent Number: 5,854,933
[45] Date of Patent: Dec. 29, 1998

[54] METHOD FOR OPTIMIZING A COMPUTER PROGRAM BY MOVING CERTAIN LOAD AND STORE INSTRUCTIONS OUT OF A LOOP

[75] Inventor: Po-Hua Chang, Saratoga, Calif.

[73] Assignee: Intel Corporation, Santa Clara, Calif.

[21] Appl. No.: 700,034

[22] Filed: Aug. 20, 1996

[51] Int. Cl.$^6$ .............................. G06F 12/00; G06F 9/45
[52] U.S. Cl. .......................... 395/709; 395/704; 395/705; 395/706; 395/569
[58] Field of Search .................................... 395/704–709, 395/588, 569; 364/280.4, 280.5, 262.1, 263, 473, 938, 259.2, 261.5, 247.7, 234.4, 243.41, 244.3, 247.8, 254.3, 255.2, 247.6, 946.2

[56] References Cited

U.S. PATENT DOCUMENTS

| | | | |
|---|---|---|---|
| 5,265,253 | 11/1993 | Yamada ................................... | 395/709 |
| 5,287,510 | 2/1994 | Hall et al. .............................. | 395/709 |
| 5,317,743 | 5/1994 | Imai et al. .............................. | 395/706 |
| 5,386,562 | 1/1995 | Jain et al. ............................... | 395/709 |
| 5,438,669 | 8/1995 | Nakazawa .............................. | 395/563 |
| 5,649,203 | 7/1997 | Sites ....................................... | 395/709 |
| 5,652,889 | 7/1997 | Sites ....................................... | 395/708 |

OTHER PUBLICATIONS

Banerjee et al., "An optimizing compiler for FP*—a data-parallel dialect of FP", IEEE Computer Society Press, pp. 70–78.

Saltz et al., "Run–time parallelization and scheduling of loops", IEEE Trans. on Computers, vol. 40, No. 5, pp. 603–612.

Shostak, "Deciding linear inequalities by computing loop residues", Journal of the Association for Computing Machinery, vol. 28, No. 4, pp. 769–779.

Smith et al., "Branch prediction strategies & branch target buffer design", Computer magazine, pp. 6–22.

Kuch et al., "Dependent graphs & compiler optimizations", 8th Conference on Principles of Programming Languages, ACM, pp. 207–218.

"The Computer Science and Engineering Handbook" Edited by Allen B. Tucker, Jr. (1997), pp. ii, 2140–2142.

"Compilers—Principles, Techniques, and Tools" by Alfred V. Aho, Ravi Sethi and Jeffrey D. Ullman (1986), pp. 596–598; 638–643; 710–712; 742–744.

*Primary Examiner*—James P. Trammell
*Assistant Examiner*—Cuong H. Nguyen
*Attorney, Agent, or Firm*—Arnold, White & Durkee

[57] ABSTRACT

A method, performed by a computer, for optimizing a computer program having a plurality of instructions that form a loop. The loop has a first block and a second block. The first block has at least one instruction for using a variable and the second block has an ambiguous definition instruction for defining the variable. A load instruction for loading the variable into a register is inserted prior to the plurality of instructions that form the loop. In addition, at least one instruction for using the variable is replaced with an instruction for using the register. Further, a load instruction for loading the variable into the register is inserted after the ambiguous definition instruction.

24 Claims, 2 Drawing Sheets

```
L10: If (xxx) {
        . . .
        x = x + 1
        . . . }
     else {
        . . .
        call update(x);
        . . . }
     If (xx) then goto L10;
```

FIG. 1

```
     r = load(x)
L10: If (xxx) {
        . . .
        r = r + 1;
        . . . }
     else {
        . . .
        store(x) = r
        call update (x);
        r = load(x)
        . . . }
     If (xx) then goto L10;
     store(x) = r
```

FIG. 4

| If-xxx-is-true block | ... <br> x = x+1; <br> ... |
|---|---|
| If-xxx-is-false block | ... <br> call update(x); <br> ... |

FIG. 2

METHOD FOR OPTIMIZING A COMPUTER PROGRAM BY MOVING CERTAIN LOAD AND STORE INSTRUCTIONS OUT OF A LOOP

BACKGROUND OF THE INVENTION

This invention relates to a compiler optimization. This invention is particularly useful for removing memory load and/or store instructions outside of loops in a computer program.

Most computer programmers write computer programs in high-level languages such as C, FORTRAN or PASCAL. While programmers may easily understand such languages, modern computers are not able to directly read such languages. Thus, such computer programs must be translated into a language, known as machine language, that a computer can understand. One step in the translating process is performed by a compiler. A compiler is a computer program that translates a high-level computer program into object code. Object code is a machine language description of a high-level computer program. Object code produced by straight forward compiling algorithms can often be made to execute faster. This improvement is called optimization. Compilers that apply code-improving transformations are called optimizing compilers.

Variables in high-level languages are an abstraction of memory locations. One of the compiler's tasks when translating a high-level computer language program into object code is to assign these abstract variables into physical locations. For example, a compiler may assign a particular variable to a register within a microprocessor. Alternatively, it may assign a particular variable to a location within external memory. The method that a compiler utilizes to assign variables to registers and memory locations in part determines the execution time of a computer program.

If two variables are located in a microprocessor's registers then the microprocessor may efficiently operate on the two variables. For example, a microprocessor may calculate the sum of two variables that are located in its registers without accessing external memory. On the other hand, if the two variables are located in external memory, then the microprocessor must first load the two variables from external memory into registers before it may operate on the variables. Next, it must store the sum back into external memory. Such loads and stores increase the execution time of a computer program.

Unambiguous Definitions

A computer instruction is said to "define" a variable if it assigns, or may assign, a value to the variable. For example, a statement, "x=y," assigns the value of y to x. Such a statement certainly "defines" the value of x and is referred to as an "unambiguous definition" of x.

Ambiguous Definitions

There are other types of "definitions" that may "define" a value for a variable; they are called "ambiguous definitions." One type of "ambiguous definition" is a call of a procedure with a variable as a parameter passed by reference. Variables sent to a subroutine may be passed by reference, where the address of the variable is passed to the subroutine. Passing by reference allows modifications to the original variable. Alternatively, variables may be passed by value. Passing a variable by value does not allow the subroutine to modify the variable.

Another type of "ambiguous definition" is a procedure that can access a variable because that variable is in the scope of the procedure. Still another type of "ambiguous definition" occurs when a variable is not in the scope of a procedure but the variable has been identified with another variable that is passed as a parameter or is in the scope of the procedure. Still another "ambiguous definition" occurs through a pointer that may refer to a variable. For example, the instruction "*q:=y" is a definition of x if it is possible that q points to x.

Use

The instruction "x=y+z" is said to "define" x and "use" y and z. Similarly, y and z (but not x) are "used" in the instruction "x[y]=z."

Loops

A widely held belief is that a computer program spends ninety per cent of its execution time in ten per cent of the program. While the actual percentages may vary, it is often the case that a small fraction of a computer program accounts for most of the execution time. A computer program often spends a large percentage of its time executing loops. A loop is a sequence of instructions that is to be executed iteratively. Some modem structured languages have looping control constructs such as "while," "repeat," "goto," and "for" statements. Thus, these loops may be easily determined from the syntax of the program.

A loop typically has one entry point and one exit point. However, it may have several entry points and several exit points. An entry point is an instruction in a loop. The only way to reach an instruction in a loop is to first execute the entry point. An exit point is also an instruction in a loop. The only way to reach an instruction outside the loop from inside the loop is to go through an exit point. An exit point is the last instruction executed in a loop.

A loop may have more than one block. A block is a sequence of consecutive instructions in which flow of control enters at the beginning and leaves at the end without halt or possibility of branching except at the end. For example, the following C pseudo code loop has two blocks.

```
L10: if (xxx) {
        ...
        x = x + 1;
        ...}
     else {
        ...
        call update(x)
        ...}
     If (xx) then goto L10;
```

The first block consists of instructions that execute if xxx is true. This block increments x by 1. The second block consists of the instructions that execute if xxx is false. This block calls the subroutine "update(x)."

Conventional Methods of Assigning Variables to Registers

One conventional method of assigning variables to registers is to assign as many variables to registers as possible and then assign any remaining variables to external memory. This method is typically sufficient, except when there is a limited number of registers such as in the Intel x86 processors. Another method of assigning variables is to assign registers to the variables that have the greatest utilization and then assign any remaining variables to external memory.

As was discussed above, variables within loops are often the most utilized variables. Consider the following loop that contains only "unambiguous definitions" of x.

```
L10: . . .
     x = x + 1;
     . . .
     If (xx) then goto L10;
```

A conventional optimizing compiler may optimize the above loop as follows.

```
     r = load(x);
L10: . . .
     r = r + 1;
     . . .
     If (xx) then goto L10;
     store(x) = r;
```

In this loop, r is a register. The load function copies the variable x from external memory to r. Similarly, the store function copies the contents of r to external memory. Note that the load and store instructions are outside of the loop. This type of register assignment minimizes the number of reads and writes to external memory and reduces the execution time of the loop.

As shown above, it is often optimal to insert load and store instructions outside of a loop. However, utilizing conventional register assignment methods, it is not always possible to insert such instructions outside of a loop.

Consider the following C pseudo code loop.

```
L10: if (xxx) {
         . . .
         x = x + 1;
         . . . }
     else {
         . . .
         call update(x);
         . . . }
     If (xx) then goto L10;
```

If update is an "ambiguous definition" instruction, then conventional register assignment methods would not insert load(x) and store(x) insertions outside of the loop. Conventional methods may translate the above loop to the following loop.

```
L10: If(xxx) {
         . . .
         r = load(x);
         r = r + 1;
         store(x) = r;
         . . . }
     else {
         . . .
         call update(x);
         . . . }
     If (xx) then goto L10;
```

This translated loop is not optimal. The fact that the load(x) and store(x) instructions occur inside of the loop increases the execution time of the loop. The execution time is significantly increased if the if-xxx-is-true block is executed many more times than the if-xxx-is-false block.

If a loop contains an "ambiguous definition" instruction that "defines" a variable, then conventional assignment methods do not insert load and store instructions outside of the loop. These translation methods are not optimal. Thus, a need exists for an optimization for computer programs having loops with "unambiguous definitions" in a frequently executed block and "unambiguous definitions" in a less frequently executed block.

SUMMARY OF THE INVENTION

A method, performed by a microprocessor, for optimizing a computer program having a plurality of instructions that form a loop. The loop has a first block and a second block. The first block has at least one instruction for using a variable and the second block has an ambiguous definition instruction for defining the variable. A load instruction for loading the variable into a register is inserted prior to the plurality of instructions that form the loop. In addition, at least one instruction for using the variable is replaced with an instruction for using the register. Further, a load instruction for loading the variable into the register is inserted after the ambiguous definition instruction.

BRIEF DESCRIPTION OF THE DRAWINGS

FIG. 1 presents C pseudo code for a loop.

FIG. 2 is a diagram of two blocks of the C pseudo code of FIG. 1.

FIG. 4 presents optimized C pseudo code for the loop of FIG. 1.

DETAILED DESCRIPTION OF SPECIFIC EMBODIMENTS

Figure 3:
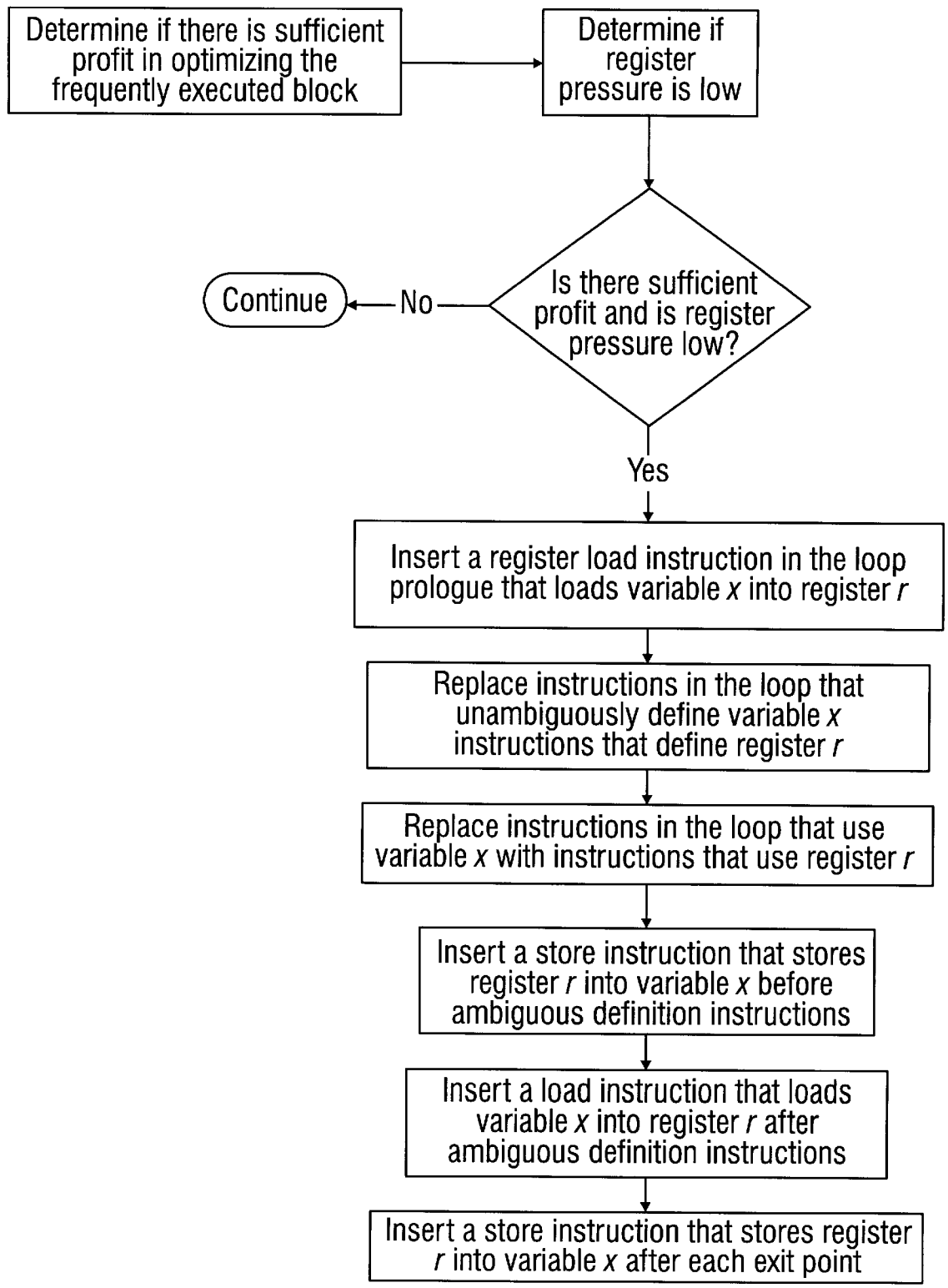
FIG. 3 is a flow diagram of a method for optimizing a computer program.

A computer program having a loop is shown in FIG. 1. The plurality of instructions that form the loop may be broken into two blocks as shown in FIG. 2. While only a single instruction is shown in each block in FIG. 2, the ellipses indicate that the blocks may contain a plurality of instructions before and/or after the shown instructions.

In most loops that contain two blocks, one block is executed significantly more times than the other block. The frequency of execution of each block may be determined by utilizing conventional profiling techniques. In this example, it will be assumed that the if-xxx-is-true block is executed more often than the if-xxx-is-false block. Thus, the if-xxx-is-true block will be referred to as the frequently executed block and the if-xxx-is-false block will be referred to as the less frequently executed block.

The loop of FIG. 1 has a single exit point. The exit point is the instruction "If (xx) then go to L10." If xx is false, then the loop is exited. This instruction is always the last instruction executed prior to leaving the loop.

As shown in FIG. 2, the frequently executed block contains a plurality of instructions. One of the instructions "x=x+1" unambiguously "defines" x. In addition, that instruction "uses" x. Note that there are no "ambiguous definitions" of x in the frequently executed block. Thus, a significant reduction in execution time may result from optimization of this block.

The less frequently executed block contains a plurality of instructions. If it is assumed that "update(x)" passes x by reference, then update(x) ambiguously "defines" x. Thus, the instruction "call update(x)" is an "ambiguous definition" instruction.

Determine if There is Sufficient Profit in Optimizing the Frequently Executed Block FIG. 3 presents a method for optimizing a computer program. As shown in FIG. 3, one step in the method is to determine if there is sufficient profit in optimizing the frequently executed block.

As discussed above, by utilizing profiling techniques it is possible to determine the frequency of execution of a particular block. For example, a simple method to determine the frequency of execution of a particular block would be to execute the computer program containing the block and count the number of times that the block is executed. Alternatively, the percentage of time that the program spends executing the block could be similarly determined. In addition, any conventional profiling technique may be utilized to determine the frequency of execution of a particular block.

If a profiling technique determines that a block is only executed a small number of times, then there is little to be gained by optimizing the block. However, if the profiling technique determines that a block is executed many times, then optimization may provide a significant reduction in the execution time of the computer program. Thus, there may be sufficient profit in moving load and store instructions outside of a loop.

As is often the case in optimizing computer programs, performing the optimization takes time. For large computer programs, optimizing can take significant amounts of time. Thus, computer programmers often set a profit threshold that needs to be met prior to initiating optimization. For example, one such threshold may be to optimize a block only if the computer program spends over 1% of its time executing in the block. Alternatively, under some circumstances, a computer programmer could set a threshold so low that all optimizations would be performed regardless of the profit to be obtained as a result of the optimization.

Determine if Register Pressure is Low

Again referring to FIG. 3, the register pressure is determined. Some computer architectures have a very limited number of registers available. For example the well-known Intel x86 computer architecture has only 8 general purpose registers. Thus, it is not be possible to assign 10 variables to registers at the same time.

If, at the entry point to a loop, only one of 8 registers have been assigned, then the register pressure is likely to be low. In addition, if a loop "defines" and "uses" only a single variable, then register pressure is likely to be low.

On the other hand, if at the entry point all registers have been assigned, then the register pressure is likely to be high. Similarly, if a loop "uses" and "defines" a large number of variables, then the register pressure is likely to be high.

Register pressure may be determined by counting the number of unassigned registers. Similarly, register pressure may be determined by counting the number of variables in a loop that are likely to be assigned to registers. Conventional methods of determining register pressure may also be utilized.

Referring to FIGS. 3 and 4, if there is sufficient profit optimizing the frequently executed block and register pressure is low, then several instructions in the computer program are inserted and several instructions are replaced. The new instructions minimize the number loop instructions that access external memory.

Insert a Register Load Instruction

One instruction that is inserted is a load instruction. This load instruction loads the variable x into an unassigned register r. This load instruction is inserted prior to the plurality of instructions that form the loop. This instruction may be inserted in the loop prologue. By loading x into register r, certain subsequent instructions may operate on x without accessing external memory.

Replace Instructions in the Loop that Unambiguously Define the Variable with Instructions that Define the Register Referring again to FIGS. 3 and 4, instructions in the loop that unambiguously "define" the variable x are replaced with instructions that "define" the register r. These instructions may be rapidly executed because they do not need to access external memory when "defining" x.

Replace Instructions in the Loop that Use the Variable with Instructions that Use the Register Similarly, instructions in the loop that "use" the variable x are replaced with instructions that "use" the register r. These instructions may also be rapidly executed.

Insert a Store Instruction Before Ambiguous Definition Instructions

Referring again to FIGS. 3 and 4, a store instruction is inserted before any "ambiguous definition" instructions in the less frequently executed loop. This instruction stores the current value held in register r into variable x. Thus, the "ambiguous definition" instruction will be provided with the correct value of x.

Insert a Load Instruction After the Ambiguous Definition Instruction

A load instruction is also inserted after any "ambiguous definition" instructions in the less frequently executed loop. This load instruction loads the possibly updated value for x that is returned by the "ambiguous definition" instruction into register r. This load instruction allows subsequent "use" instructions and "unambiguous definition" instructions to operate directly on register r without external memory accesses.

Insert a Store Instruction After Each Exit Point

Finally, a store instruction is inserted after each loop exit point. This store instruction stores the value held in register r into variable x. This instruction ensures that other blocks will be provided with the correct value of variable x.

Loops that Contain Uses but Not Unambiguous Definitions of Variable

As was discussed above, optimizations often take significant time to complete. Thus, it is often important to minimize optimization time. Such a minimization may occur if a loop contains only "uses" but not "unambiguous definitions" of a variable. In this case, if sufficient profit exists and register pressure is low then only the instruction insertions and instruction replacements discussed in sections 4.3, 4.4, and 4.7 need be made.

REMARKS

Any of the foregoing variations may be implemented by programming a suitable general purpose computer. The programming may be accomplished through the use of a program storage device readable by the general purpose computer and encoding a program of instructions executable by the computer for performing the operations described above. The program storage device may take the form of, e.g., one or more floppy disks, a CD ROM or other optical disk, a magnetic tape, a read-only memory chip (ROM), and other forms of the kind well-known in the art or subsequently developed. The program of instructions may be object code, or a high-level language, or in some intermediate form such as partially compiled code. The precise forms of the program storage device and of the encoding of instructions are immaterial.

A primary advantage of the above described method of optimizing a computer program is that it may significantly reduce the execution time of a computer program. The method has been shown to reduce the execution time of computer programs by more than 40%. This reduction in execution time results from moving load and store instructions outside of loops. This reduction in execution time is particularly significant for loops that contain: (1) a frequently executed block that contains "uses" and "unambiguous definitions" but does not contain any "ambiguous definitions" of a particular variable; and (2) a less frequently executed block that does contain an "ambiguous definition" of that variable.

Another advantage of the above described method of optimizing a computer program is that it preserves the meaning of computer programs. That is, the method does not change the output produced by a program for a given input or cause an error that was not present in the original version of the computer program. Thus, the method is a "safe" method.

Still another advantage is that the above method may be rapidly applied to additional variables in a loop. The determination of sufficient profit may or may not be performed for these additional variables in a single loop. However, the register pressure determination will likely be performed for such additional variables.

It will be appreciated by those of ordinary skill having the benefit of this disclosure that the illustrative embodiments described above are capable of numerous variations without departing from the scope and spirit of the invention. For example, while the steps of particular embodiments are described in a sequence, there is no requirement to perform the steps in any particular sequence. As a specific example, the order of any of the instruction insertions and instruction replacements may be modified. Similarly, there is no need to determine the profit of the optimization prior to determining the register pressure. In fact, the register pressure may only be determined if the sufficient profit exists. Similarly, the profit may only be determined if register pressure is low. Alternatively, if compilation time is not critical, one or both of these determinations may not be made at all.

While the optimization method is presented utilizing C pseudo code, the method is not limited to C. The optimization method may be performed on any high-level computer program such as C++, FORTRAN, COBOL, PASCAL, etc. Furthermore, the method may by performed on a computer program written or stored in object code or machine language. Still further, the method may be performed on a computer program stored in an intermediate compiler language that may be utilized to perform other optimizations prior to translation to object code.

Accordingly, the exclusive rights sought to be patented are as described in the claims below.

What is claimed is:

1. A method, performed by a microprocessor, for optimizing a computer program having a plurality of instructions that form a loop, the loop having a first block and a second block, the first block having at least one instruction for using a variable, the second block having at least one ambiguous definition instruction for defining the variable, the method comprising:
    (a) inserting a load instruction for loading the variable into a register, the load instruction being inserted prior to the plurality of instructions that form the loop;
    (b) replacing the at least one instruction for using the variable with an instruction for using the register; and
    (c) inserting a load instruction for loading the variable into the register after the at least one ambiguous definition instruction.

2. The method of claim 1, wherein the first block does not have any unambiguous definition instructions.

3. A method, performed by a microprocessor, for optimizing a computer program having a plurality of instructions that form a loop, the loop having a frequently executed block and a less frequently executed block, the frequently executed block having at least one instruction for using a variable, the less frequently executed block having at least one ambiguous definition instruction for defining the variable, the method comprising:
    (a) determining if there is sufficient profit in optimizing the frequently executed block;
    (b) determining if register pressure is low; and
    (c) if there is sufficient profit in assigning the variable to a register and register pressure is low, then
        i) inserting a load instruction for loading the variable into a register, the load instruction being inserted prior to the plurality of instructions that form the loop;
        ii) replacing the at least one instruction for using the variable with an instruction for using the register; and
        iii) inserting a load instruction for loading the variable into the register after the at least one ambiguous definition instruction.

4. The method of claim 3, wherein profiling is utilized to determine the frequently executed block and the less frequently executed block.

5. The method of claim 3, wherein the frequently executed block does not have any unambiguous definition instructions.

6. A method, performed by a microprocessor, for optimizing a computer program having a plurality of instructions that form a loop, the loop having at least one exit point, a first block, and a second block, the first block having at least one unambiguous definition instruction for defining a variable and at least one instruction for using the variable, the second executed block having a ambiguous definition instruction, the method comprising:
    (a) inserting a load instruction for loading the variable into a register, the load instruction being inserted prior to the plurality of instructions that form the loop;
    (b) replacing the at least one instruction for unambiguously defining the variable with an instruction for defining the register;
    (c) replacing the at least one instruction for using the variable with an instruction for using the register;
    (d) inserting a store instruction for storing the register into the variable before the at least one ambiguous definition instruction;
    (e) inserting a load instruction for loading the variable into the register after the at least one ambiguous definition instruction; and
    (f) inserting an instruction for storing the register into the variable after each loop exit point.

7. The method of claim 6, wherein the first block does not have any unambiguous definition instructions.

8. A method, performed by a microprocessor, for optimizing a computer program having a plurality of instructions that form a loop, the loop having at least one exit point, a frequently executed block, and a less frequently executed block, the frequently executed block having at least one unambiguous definition instruction for defining a variable and at least one instruction for using the variable, the less frequently executed block having a ambiguous definition instruction, the method comprising:

(a) determining if there is sufficient profit in optimizing the frequently executed block;

(b) determining if register pressure is low; and (c) if there is sufficient profit in assigning the variable to a register and register pressure is low, then i) inserting a load instruction for loading the variable into a register, the load instruction being inserted prior to the plurality of instructions that form the loop, ii) replacing the at least one instruction for unambiguously defining the variable with an instruction for defining the register, iii) replacing the at least one instruction for using the variable with an instruction for using the register, iv) inserting a store instruction for storing the register into the variable before the at least one ambiguous definition instruction, v) inserting a load instruction for loading the variable into the register after the at least one ambiguous definition instruction, and vi) inserting an instruction for storing the register into the variable after each loop exit point.

9. The method of claim 8, wherein profiling is utilized to determine the frequently executed block and the less frequently executed block.

10. The method of claim 8, wherein the frequently executed block does not have any unambiguous definition instructions.

11. A computer program encoded on a computer-readable medium for execution by a computer, the program including a plurality of instructions that form a loop, the loop including a first block and a second block, the first block including at least one instruction for using a variable, the second block including at least one ambiguous definition instruction for defining the variable, the computer program being formed by:

(a) inserting a load instruction for loading the variable into a register, the load instruction being inserted prior to the plurality of instructions that form the loop;

(b) replacing the at least one instruction for using the variable with an instruction for using the register; and (c) inserting a load instruction for loading the variable into the register after the at least one ambiguous definition instruction.

12. A computer program encoded on a computer-readable medium for execution by a computer, the program including a plurality of instructions that form a loop, the loop including at least one exit point, a first block, and a second block, the first block including at least one unambiguous definition instruction for defining a variable and at least one instruction for using the variable, the second executed block including an ambiguous definition instruction, the computer program being formed by:

(a) inserting a load instruction for loading the variable into a register, the load instruction being inserted prior to the plurality of instructions that form the loop;

(b) replacing the at least one instruction for unambiguously defining the variable with an instruction for defining the register;

(c) replacing the at least one instruction for using the variable with an instruction for using the register;

(d) inserting a store instruction for storing the register into the variable before the at least one ambiguous definition instruction;

(e) inserting a load instruction for loading the variable into the register after the at least one ambiguous definition instruction; and (f) inserting an instruction for storing the register into the variable after each loop exit point.

13. The computer program of claim 11, wherein the first block does not have any unambiguous definition instructions.

14. The computer program of claim 12, wherein the first block does not have any unambiguous definition instructions.

15. A computer-readable medium encoded with instructions that, when executed by a computer, perform a method for optimizing a computer program, the method comprising:

(a) inserting a load instruction for loading a variable into a register, the load instruction being inserted prior to a plurality of instructions forming a loop, the loop further comprising:

i) a first block including an instruction for using the variable; and ii) a second block including an ambiguous definition instruction for defining the variable;

(b) replacing the instruction for using the variable with an instruction for using the register; and (c) inserting a load instruction for loading the variable into the register after the ambiguous definition instruction.

16. The computer-readable storage medium of claim 15, wherein the first block does not include any unambiguous definition instructions.

17. A computer-readable medium encoded with instructions that, when executed by a computer, perform a method for optimizing a computer program comprising a plurality of instructions forming a loop including a frequently executed block and a less frequently executed block, the frequently executed block further including at least one instruction for using a variable and the less frequently executed block further including at least one ambiguous definition instruction for defining the variable, the method comprising:

(a) determining if there is sufficient profit in optimizing the frequently executed block;

(b) determining if register pressure is low; and (c) if there is sufficient profit in assigning the variable to a register and register pressure is low, then i) inserting a load instruction for loading the variable into a register, the load instruction being inserted prior to the plurality of instructions that form the loop;

ii) replacing the at least one instruction for using the variable with an instruction for using the register; and iii) inserting a load instruction for loading the variable into the register after the at least one ambiguous definition instruction.

18. The computer-readable medium of claim 17, wherein the method further comprises profiling the loop to determine the frequently executed block and the less frequently executed block.

19. The computer-readable medium of claim 17, wherein the frequently executed block does not have any unambiguous definition instructions.

20. A computer-readable medium encoded with instructions that, when executed by a computer, perform a method for optimizing a computer program, the method comprising:

(a) inserting a load instruction for loading a variable into a register, the load instruction being inserted prior to a plurality of instructions that form a loop comprising at least one exit point, a first block including at least one unambiguous definition instruction for defining the variable and at least one instruction for using the variable, and a second executed block including an ambiguous definition instruction;

(b) replacing the at least one instruction for unambiguous definition instruction for defining the variable with an instruction for defining the register;

(c) replacing the at least one instruction for using the variable with an instruction for using the register;

(d) inserting a store instruction for storing the register into the variable before the at least one ambiguous definition instruction;

(e) inserting a load instruction for loading the variable into the register after the at least one ambiguous definition instruction; and (f) inserting an instruction for storing the register into the variable after each loop exit point.

21. The computer-readable medium of claim 20, wherein the first block does not have any unambiguous definition instructions.

22. A computer-readable storage medium encoded with instructions that, when executed by a computer, perform a method for optimizing a computer program, the method comprising:

(a) determining if there is sufficient profit in optimizing a frequently executed block in a plurality of instructions that form a loop, the loop comprising at least one exit point, the frequently executed block, and a less frequently executed block, the frequently executed block including at least one unambiguous definition instruction for defining a variable and at least one instruction for using the variable, and the less frequently executed block including an ambiguous definition instruction;

(b) determining if register pressure is low; and (c) if there is sufficient profit in assigning the variable to a register and register pressure is low, then
 i) inserting a load instruction for loading the variable into a register, the load instruction being inserted prior to the plurality of instructions that form the loop,
 ii) replacing the at least one instruction for unambiguously defining the variable with an instruction for defining the register,
 iii) replacing the at least one instruction for using the variable with an instruction for using the register,
 iv) inserting a store instruction for storing the register into the variable before the at least one ambiguous definition instruction,
 v) inserting a load instruction for loading the variable into the register after the at least one ambiguous definition instruction, and
 vi) inserting an instruction for storing the register into the variable after each exit point.

23. The computer-readable medium of claim 22, wherein the method further comprises profiling utilized to determine the frequently executed block and the less frequently executed block.

24. The computer-readable medium of claim 22, wherein the frequently executed block does not have any unambiguous definition instructions.

* * * * *